United States Patent Office 3,476,763
Patented Nov. 4, 1969

1

3,476,763
AROMATIC HYDRAZINE COMPOUNDS CONTAINING A LONG ALIPHATIC CHAIN
Marcel Jacob Monbaliu and Arthur Henri De Cat, Mortsel-Antwerp, and Raphael Karel van Poucke, Mechelen, Belgium, assignors to Gevaert Photo-Producten N.V., Mortsel, Belgium, a company of Belgium
No Drawing. Continuation-in-part of application Ser. No. 314,594, Oct. 8, 1963. This application Apr. 6, 1965, Ser. No. 446,108
Int. Cl. C07d 31/48; C07c 143/82, 143/00
U.S. Cl. 260—294.8       7 Claims

ABSTRACT OF THE DISCLOSURE

Aromatic hydrazines and their salts having the general formula:

$$X—(Y)_{n-1}—Z—NH—NH_2$$

wherein:
X is an aliphatic chain with 12 to 24 carbon atoms,
Y is selected from oxygen, sulfur, sulfonyl, —CONH—, —SO$_2$UH—, a —SO$_2$U(alkyl)— group, and a —N(alkyl)— group,
Z is a bivalent nucleus with aromatic nature such as a bivalent nucleus of the benzene series, the naphthalene series or the pyridine series, which nuclei may be substituted with one or more substituents, e.g., with halogen and trifluoromethyl, and
n is 1 or 2, and methods for preparing same are disclosed. The hydrazines are particularly useful in the preparation of nonmigratory color couplers for use in color photography.

This invention refers to hydrazino compounds and their salts comprising a long aliphatic chain in their structure and to the preparation of said compounds.

The present application is a continuation-in-part of our patent application Serial No. 314,594 filed October 8, 1963, now U.S. Patent No. 3,325,482.

More particularly the present invention is concerned with hydrazines and salts derived thereof corresponding to the following general formula:

$$X—(Y)_{n-1}—Z—NH—NH_2$$

wherein:
X is an aliphatic chain with 12 to 24 carbon atoms,
Y is selected from oxygen, sulfur, sulfonyl, —CONH—, —SO$_2$NH—, a —SO$_2$N(alkyl)— group, and a —N(alkyl) group,
Z is a bivalent nucleus with aromatic nature such as a bivalent nucleus of the benzent series, the naphthalene series or the pyridine series, which nuclei may be substituted with one or more substituents e.g. with halogen and trifluoromethyl, and
n is 1 or 2.

According to a first preparation method of general application these compounds are prepared by diazotization of the corresponding amine and a subsequent reduction of the diazonium salt.

The diazotization is performed in an organic solvent, which is chemically inert for the reagents and final products, in the presence of a sufficient amount of strong acid and by means of an alkyl nitrite such as isoamyl nitrite. The degree of the diazotization is indirectly proportional to the quantity of water present in the reaction medium. Appropriate organic solvents for carrying out the diazotization are i.e. acetic acid, isopropanol, and n-propanol.

The amines used in the diazotization can be represented by the following general formula:

$$X—(Y)_{n-1}—Z—NH_2$$

wherein X, Y, Z and n have the same meaning as described above. Amines of this type are described e.g. in the British patent specifications 939,030 and 983,648 and in the Belgian patent specifications 634,665 and 634,669.

For carrying out the diazotization these amines are dissolved or suspended in an appropriate organic solvent as defined above. After the addition of 2 to 3 mols of hydrogen chloride in the form of concentrated hydrochloric acid, calculated in regard of the amine, the diazotization is carried out with an alkyl nitrite, preferably isomyl nitrite in equimolecular amount or in an excess (e.g. 30%). The period of time of the diazotization and the reaction temperature depend on the reactivity of the used amine and on the stability of the formed diazonium compound. Generally the diazotization is executed at a temperature ranging from 15 to 40° C. The conversion requires a reaction time of 15 to 60 min. After diazotization, the surplus nitrite, if any, can be decomposed by adding urea. The diazonium compound formed is reduced preferably with at least twice the molar amount of tin(II) chloride-2-water dissolved in concentrated hydrochloric acid (approximately 1 g. per ml). According to the technical outfit the tin(II) chloride solution can conveniently be added to the solution of the diazonium salt or the latter can be added to the former.

Inasmuch as the reduction proceeds exothermally and since the thermolability of diazonium compounds has to be taken into account, the temperature at which the reduction is performed must be kept below definite limits. Favorable results are gained at a temperature of at most 12° C. for the reduction of diazonium salts with electron-donating substituents and at a temperature not beyond 20° C. for the reduction of diazonium salts with electron-withdrawing groups.

When the reduction is completed the reaction product is separated. In certain cases the corresponding hydrazine salt can be obtained in a very pure state by recrystallization from a suitable organic solvent (see Preparation 1).

According to another purification method the reaction product is extracted at boiling temperature from the reaction mass with an organic solvent immiscible with water e.g. n-hexane, isopropyl ether or benzene.

The extracted hydrazine salt can then be converted in organic medium e.g. in ethanol with alkali into the free hydrazine base (see preparation 2).

According to a second process having, however, more restricted possibilities certain hydrazines can be prepared starting from aromatic halide compounds, which on the aromatic nucleus bear an electron-withdrawing group in ortho- and/or para-position with regard to the halogen atom.

In Ind. and Eng. News 42 (1950) 1862 G. D. Byrkit and G. A. Michalek described the reaction of these halides with hydrazine hydrate to form the corresponding hydrazines. In J. prakt. Chem. 132 (1931) 24–38 E. Koenigs and A. Wylezick described the reaction of alkylsulphonyl-phenyl halides with hydrazine hydrate in boiling ethanol. It can be inferred from the examples of the latter reference that the yield is indirectly proportional to the length of the aliphatic chain of the starting product and that the increase of the reaction temperature is not found to be advantageous.

More particularly according to said second process it is possible to prepare hydrazines having the following general formula:

$$X—(Y)_{n-1}—Z_1—NH—NH_2$$

wherein: X, Y and n have the same meaning as described above, and $Z_1$ is a bivalent nucleus with aromatic character, which is substitued in ortho- and/or para-position in respect of the —NH—NH$_2$ group by an electron-withdrawing group. Hydrazines of that type are e.g. o-alkylsulphonylphenylhydrazine, p-alkylsulphonylphenylhydrazine, N - alkylsulphamoylphenylhydrazine, N,N - dialkylsulphamoylphenylhydrazine and similar 2-hydrazinopyridine derivatives.

The preparation proceeds by allowing to react the corresponding active halogen compounds corresponding with said hydrazines with anhydrous hydrazine. The reaction is preferably carried out at boiling temperature in an organic solvent, which is inert in regard of the reagents and the final products. Moreover, the reaction is preferably performed in homogeneous phase. This matter should be considered when selecting the solvent. A particularly suitable solvent for this kind of reaction is e.g. ethylene glycol monomethyl ether.

Although in principle the substitution reaction can be executed with twice the molar amount of hydrazine, there is generally used 10 to 15 times the molar amount of anhydrous hydrazine in order to reduce the reaction time.

The concentration of dissolved halide is preferably the highest possible, e.g. 1.5 to 2 mole per liter of ethylene glycol monomethyl ether.

Obviously the reaction time is also dependent on the nature of the activating substituents on the aromatic nucleus and the nature of the halogen to be substituted. The choice of the halogen to be replaced by a hydrazino group in the substitution reaction is strongly influenced by the required activation and by the economical aspects of the process. Taking into account the reactivity of the starting products the reaction solution is refluxed for 1 to 24 hours to obtain complete substitution.

After the reaction, the hydrazine derivative can be obtained in crystalline state and with a high degree of purity by cooling and/or precipitating (in water, methanol, or ethanol) and thoroughly rinsing with water.

The following preparations illustrate the invention.

PREPARATION 1 o-Octadecylthiophenylhydrazine

An amount of 87.5 cc. of isoamyl nitrite (0.65 mole) at 27–30° C. is added to a suspension of 206.8 g. of o-octadecylthioaniline hydrochloride (0.5 mole) in 1750 cc. of acetic acid and 100 cc. of concentrated hydrochloric acid (1.2 moles). After 30 minutes a yellow solution is obtained, to which 9 g. of urea (0.15 mole) are added. The resulting solution is stirred for 30 minutes.

The reduction is carried out by adding in 75 minutes a solution of 260 g. of tin(II)-chloride-2-water (1.15 moles) in 300 cc. of 12 N hydrochloric acid to the diazonium solution at 5–10° C. After stirring for 60 minutes the mixture is heated till dissolution and poured out on ice. The obtained precipitate is filtered off and extracted with 800 cc. of boiling n-hexane.

The hexane solution is cooled and the resulting precipitate is filtered and dried. The hydrazine base is set free from the obtained product by dissolving this product in 800 cc. of ethanol comprising an amount of potassium hydroxide, which neutralises 90% of the bound acid. Solid potassium carbonate is then added till complete neutralisation (+slight excess). This treatment is performed while stirring and boiling for 30 minutes. 134 g. of o-octadecylthiophenylhydrazine (68%) are obtained on filtration and cooling down. Melting point: 50° C. (Kofler hot bench).

PREPARATION 2 p-n-Hexadecylsulphonylphenylhydrazine hydrochloride

Whilst stirring 750 cc. of concentrated hydrochloric acid (9 moles) are added slowly to a solution of 1149 g. of p-n-hexadecylsulphonylaniline (3 moles) in 12 liter of acetic acid. After cooling to 40° C. 525 cc. of isoamyl nitrite (3.9 moles) are added to this mixture. Stirring is continued for another 40 minutes. 54 g. of urea in 100 cc. of water are added to the resulting yellow diazonium salt solution and stirring is continued for another 15 minutes.

The diazonium salt solution is reduced by adding within 40 minutes at 12° C. a solution of 1557 g. of tin(II)-chloride-2-water (6.9 moles) in 1500 cc. of 12 N hydrochloric acid. After stirring for another 60 minutes the reaction mixture is heated to 90° C. and cooled, whereupon the resulting precipitate is separated by centrifuging. The precipitate is recrystallized from 12 liters of ethylene glycol monomethyl ether. On drying 980 g. of p-n-hexadecylsulphonylphenylhydrazine hydrochloride (77%) (decomposition at approximatively 160° C.) are obtained.

PREPARATION 3 p-n-Hexadecylsulphamoylphenylhydrazine 1380 g. of p-n-hexadecyclsulphamoyl bromobenzene (3 moles) are boiled for 24 hours with 1424 cc. of anhydrous hydrazine (45 moles) in 1500 cc. of ethylene glycol monomethyl ether. After the addition of 3 liters of methanol, cooling, and filtering of the resulting precipitate 1100 g. of p-n-hexadecylsulphamoylphenylhydrazine (89%) are obtained. Melting point: 118° C. (Kofler hot bench).

PREPARATION 4 m-n-Hexadecyloxyphenylhydrazine (a) m-n-Hexadecyloxynitrobenzene.—A solution of 17.7 g. (0.1 mole) of m-nitrophenol and 30.5 g. (0.1 mole) of n-hexadecyl bromide in 200 cc. of ethylene glycol monomethyl ether is refluxed for 30 minutes while stirring. The reaction mixture is poured into 100 cc. of ice-water. Then the obtained grainy product is filtered off and recrystallized from isopropanol. Yield: 29.3 g. Melting point: 54° C.

(b) m-n-Hexadecyloxyaniline.—A mixture consisting of 58 g. of m-n-hexadecyloxynitrobenzene, 6 cc. of Raney nickel and 293 cc. of anhydrous ethanol was subjected to hydrogenation in an autoclave at 80° C. and 1500 p.s.i. of hydrogen until the theoretical amount of hydrogen was absorbed. The catalyst is removed by filtration and the filtrate is cooled. A white crystalline solid is filtered off and dried. Yield: 51.4 g. (97%). Melting point: 66° C.

(c) m-n-Hexadecyloxyphenylhydrazine.—To a solution of 33.3 g. of m-hexadecyloxyaniline (0.1 mole) in 350 cc. of warm acetic acid is slowly added 25 cc. of concentrated hydrochloric acid (0.3 mole). The viscous mass is cooled to 15° C. and treated with 17.5 cc. (0.13 mole) of isoamyl nitrite. After stirring for 30 minutes, a clear solution is obtained to which 1.2 g. (0.03 mole) of urea is added. After stirring for further 30 minutes, reduction is carried out at about 10° C. by adding dropwise a solution of 67.5 g. (0.22 mole) of tin (II) chloride dihydrate in 70 cc. of concentrated hydrochloric acid. After stirring for 90 minutes the reaction mixture is heated on a water bath until granulation. The product is filtered off and boiled with 500 cc. of 10 N sodium hydroxide. The formed m-hexadecyloxyphenylhydrazine is extracted with 200 cc. of hot dioxane. The dioxane layer is separated and while vigorously stirring poured into water. The solid is filtered off, dried, recrystallized from 100 cc. of hexane, and dried with shavings of paraffin wax. Yield: 19.2 g. Melting point: 68° C.

PREPARATION 5 p-n-Hexadecylsulphonylphenylhydrazine (a) p-n-Hexadecylmercaptochlorobenzene.—144.5 g. (1 mole) of p-chlorothiophenol is added to a solution of 64 g. of potassium hydroxide (purity of 88%) in 200 cc. of ethanol. To this solution are added 305 g. (1 mole) of n-hexadecyl bromide. The reaction mixture is heated for 15 minutes at 50° C., poured into water and dried. Yield: 250 g. Melting point: 45° C.

(b) p-n-Hexadecylsulphonylchlorobenzene.—To a solution of 110.5 g. (0.3 mole) of p-n-hexadecylmercaptochlorobenzene in 750 cc. of acetic acid are added at 80° C. in 20 minutes 200 cc. of hydrogen peroxide (30%). An exothermic reaction takes place, but the reaction temperature is maintained at 90° C. by cooling. After the addition of the hydrogen peroxide the mixture is heated for another 30 minutes at 40° C. Subsequently it is poured into water, and the resulting precipitate is recrystallized from ethanol. Yield: 109 g. Melting point: 65–66° C.

(c) p-n-Hexadecylsulphonylphenylhydrazine.—40 g. of p-n-hexadecylsulphonylchlorobenzene (0.1 mole) is boiled for 10 hours with 43 g. of anhydrous hydrazine in 80 cc. of ethylene glycol monomethyl ether. By addition of 200 cc. of ethanol and after cooling and filtering, a white product is obtained. Yield: 36 g. Melting point: 100° C.

Hydrazines according to the present invention, which have been prepared in accordance with the first preparation method (diazotization and reduction) are stated in the following table.

TABLE 1

| Hydrazine | Melting point in ° C. | Decomposition range of the hydrochloride in ° C. |
|---|---|---|
| 2-n-hexadecyloxyphenylhydrazine | 68 | |
| 2-octadecyloxyphenylhydrazine | 74–75 | 120–130 |
| 3-n-hexadecyloxyphenylhydrazine | 68 | 145–155 |
| 4-n-hexadecyloxyphenylhydrazine | | 80–82 |
| 2-n-hexadecylthiophenylhydrazine | 43–45 | |
| 2-n-hexadecylthio-3-chlorophenylhydrazine | 38–40 | |
| 2-octadecylthiophenylhydrazine | 50 | 150–160 |
| 4-n-hexadecylphenylhydrazine | 75 | 155–165 |
| 4-n-hexadecylsulphonylphenyl-hydrazine | 98–100 | |
| 4-n-hexadecylsulphonylnaphthylhydrazine | 88–90 | |
| 4-n-hexadecylthiophenylhydrazine | 88–89 | |
| 2-n-hexadecylthio-5-chlorophenylhydrazine | 40 | 107 |
| 2-n-hexadecyloxy-5-chlorophenylhydrazine | 55 | |
| 2-n-hexadecylsulphonylphenylhydrazine | 60 | 134 |
| 2-trifluoromethyl-4-n-hexadecyloxyphenyl-hydrazine | 56 | 115 |

Hydrazines according to the present invention, which have been prepared by substitution reaction of an activated halide with anhydrous hydrazine, are stated in the following Table 2.

TABLE 2

| Hydrazine | Melting point in ° C. |
|---|---|
| 4-n-hexadecylsulphonylphenylhydrazine | 98–100 |
| 2-chloro-4-n-hexadecylsulphonylphenylhydrazine | 103 |
| 2,6-dichloro-4-n-hexadecylsulphonylphenylhydrazine | 96 |
| 2-n-hexadecylsulphonylphenylhydrazine | 61–62 |
| 4-N,n-hexadecylsulphamoylphenylhydrazine | 118 |
| 4-(N,n-hexadecyl-N-methylsulphamoyl)-phenylhydrazine | 94 |
| 2-chloro-4-(N,n-hexadecyl-N-methylsulphamoyl)-phenylhydrazine | 80–82 |
| 2,6-dichloro-4-(N,n-hexadecyl-N-methylsulphamoly)-phenylhydrazine | 50–51 |
| 2-hydrazino-5-(N,n-hexadecyl-N-methylsulphamoyl)-pyridine | 112 |

In order to indicate the possible importance of the hydrazines according to the present invention the attention is drawn to the fact that many known hydrazines and their derivatives, such as hydrazides, pyrazolones, pyrazolidinediones, and phthalazines are applied in medicine. Some of these compounds are known as bacteriostatics or tuberculostatics. Certain pyrazole derivatives, more particularly pyrazolones and pyrazolidinediones may show an antipyretic activity. Some phthalazines decrease the blood pressure.

The most important field of application of the hydrazines according to the present invention, however, is their use as starting products for the preparation of nonmigratory colour formers for magenta, which are used in colour photography such as described i.a. in our U.S. patent application 402,652 filed Oct. 8, 1964, now U.S. Patent No. 3,330,660, and which is a continuation-in-part of our patent application Ser. No. 314,806 filed Oct. 8, 1963. The preparation of some hydrazines according to the present invention is described also in this patent specification.

What we claim is:

1. A compound selected from the group corresponding to the following general formula:

$$X—(Y)_{n-1}—Z—NH—NH_2$$

wherein:
X is a straight chain alkyl radical of from 12 to 18 carbon atoms,
Y is a member selected from the group consisting of oxygen, sulfur, sulfonyl, —CONH—, —SO$_2$NH—, —SO$_2$—(lower alkyl)— and —N(lower alkyl)—,
Z is a bivalent nucleus selected from the group consisting of phenyl, chlorophenyl, and pyridyl, and
n is taken from 1 and 2, with a proviso that when Y is sulfonyl, Z is either chlorophenyl or pyridyl.

2. A hydrochloric acid addition salt of the compounds according to the general formula of claim 1.

3. 2-n-hexadecyloxyphenylhydrazine.

4. 4-n-hexadecyloxyphenylhydrazine.

5. 2-n-hexadecylthiophenylhydrazine.

6. 2-chloro-4-n-hexadecylsulfonylphenylhydrazine.

7. 2-hydrazino-5-(N-n-hexadecyl - N-methyl-sulfamoyl)-pyridine.

References Cited

Naller, Chemistry of Organic Compounds, Saunders, second edition, pp. 491, 492, 497 and 498 (1957).

Rec. Trav. Chim. 58, pp. 387–401 (1939).

Vogel, Practical Organic Chemistry, 3rd ed., Wiley (1957), p. 627.

HENRY R. JILES, Primary Examiner

ALAN L. ROTMAN, Assistant Examiner

U.S. Cl. X.R.

96—56.5, 56.6; 260—295, 295.5, 296, 397.6, 397.7, 404.5 556, 569

PO-1050
(5/69)

UNITED STATES PATENT OFFICE
CERTIFICATE OF CORRECTION

Patent No. 3,476,763      Dated November 4, 1969

Inventor(s) Marcel J. Monbaliu et al

It is certified that error appears in the above-identified patent and that said Letters Patent are hereby corrected as shown below:

Column 1, line 24, delete "$SO_2UH$" and insert -- $SO_2NH$ --.

Column 1, line 24, delete "$SO_2U(alkyl)$" and insert -- $SO_2N(alkyl)$ --.

Column 1, line 55, delete "benzent" and insert -- benzene --.

Column 2, line 14, delete "isomyl" and insert -- isoamyl --.

Column 3, line 75, delete "nitrile" and insert -- nitrite --.

Column 5, line 29, delete "octadecyloxphyenylhydrazine" and insert

-- octadecyloxyphenylhydrazine --.

SIGNED AND
SEALED
NOV 3 1970

(SEAL)
Attest:

Edward M. Fletcher, Jr.
Attesting Officer

WILLIAM E. SCHUYLER, JR.
Commissioner of Patents